Patented May 27, 1952

2,597,903

UNITED STATES PATENT OFFICE 2,597,903

PRINTING INKS

Alfred F. Schmutzler, Teaneck, N. J.

No Drawing. Application September 30, 1949, Serial No. 119,023

10 Claims. (Cl. 106—30)

This invention relates to printing inks and more particularly to those containing an ester of shellac and a dibasic organic acid as the binder for the coloring material. The present application is a continuation in part of my abandoned application Ser. No. 573,636, filed January 19, 1945.

I have disclosed, in my above parent application, that shellac reacted with polybasic acids, such as phthalic and maleic acid or the like will result in an ester reaction product which is sufficiently soluble in mixtures of diethylene glycol and water to be suitable as a binder for steam setting printing inks.

Shellac is most commonly used as a solution in ethyl alcohol as a clear surface coating or as the vehicle in aniline inks. Some shellacs are more inclined to precipitate or gel from their "solutions" than others. By the term "solution" with regard to shellac is really meant a suspension (or colloidal dispersion) of the solid in the lacquer solvent. It is characterized by its excellent toughness and hardness. Those properties and also its good adhesion to smooth and glossy surfaces, such as cellophane, make it very desirable for printing on flatbed presses. Unfortunately, the type of inks, in which the solvent is alcohol, can only be used on special aniline ink presses and on rotogravure printing machines. For the usual typographic printing, alcohol evaporates too fast and leads to premature drying of the inks formulated with ethyl alcohol on the printing rollers. Inks containing vehicles of shellac and a non-volatile solvent, such as polyethylene glycol, dry very slowly with the advantage of excellent performance on flatbed printing presses. For faster drying, the glycols of lower molecular weight would be appropriate, but they are very poor solvents for shellac. Since they are inherently hygroscopic in addition to their poor solvency, their solutions are very unstable; just exposure to a moderate humidity having the tendency to cause the separation of the resin from the liquid. An ink formulated with such a glycol solution of shellac hardens prematurely on the rollers of the printing press so that no satisfactory output is possible.

I have discovered, as disclosed and claimed in my copending application Ser. No. 573,636, that improved inks can be prepared by reacting shellac with a polybasic acid and then dissolving this ester of shellac in polyhydric alcohols having 2 to 3 hydroxy groups. The resulting ink vehicle has great humidity tolerance and yet by exposing a thin film of ink containing this ester as the binder to steam, fast setting can be accomplished.

It has also been found that this reaction product of shellac with a dibasic organic acid, which has one of its carboxyl groups esterified while the other remains a terminal group, is readily soluble in polyhydric alcohols of lower molecular weight than diethylene glycol. These compounds include ethylene glycol, propylene glycol, butylene glycol and glycerol.

It is an object of this invention to provide for a printing ink, which has shellac reacted with a polybasic acid as the binder and a low molecuweight polyhydric alcohol having 2 to 3 hydroxy groups as the solvent for the modified shellac. Such an ink can be used for typographic printing with fast and slow operating presses. These polyhydric alcohols have sufficiently high boiling points that no premature hardening takes place on the rollers of the machines. There are two methods of speeding up the hardening of the ink after it has been printed. One method, which is applicable to practically all the low boiling and high boiling glycols, involves exposing the thin ink film to steam, non-offsetting being accomplished by the separation of pigment and binder from the polyhydric alcohol-water mixture. The other method, wherein the faster evaporating glycols, such as ethylene, propylene, butylene, pentolene and hexylene are preferred, involves exposing the ink film to moderate heat, as an alternate method of "drying," the low-molecular weight polyhydric alcohols evaporating to result in a dry ink film. Drying will also take place on short aging of the prints; it takes place partially by penetration into the fibrous stock and partially by the slow evaporation of the solvent.

The processing of the shellac is preferably done before its dissolution in the polyhydric alcohol. Varying amounts of the organic acid in relation to the shellac may be used. Since this resin has to be pictured as several radicals of trihydroxypalmitic acid forming a molecule of the resin, it is evident that the average recurring radical is a part of an ester, which has from two to three unreacted hydroxy groups. During the reaction of such a molecule with as many molecules of the anhydride of a dibasic organic acid as there are hydroxy groups available in the resin molecule, one terminal carboxyl group will be attached to the resin molecule for every hydroxyl group thus reacted with the anhydride of the dibasic acid. The additional terminal carboxyl groups in the resin molecule impart solubility to it in non-anhydrous glycols, which defines a glycol contaminated with water. A resin might be soluble in a glycol, which is anhydrous, but upon the addition of water to such a resin solution, there will occur a separation of a solid and a liquid phase, providing the resin is water-insoluble. The amount or proportion of water which can be added to the solution without causing the separation is called the water tolerance. The greater the number of molecules of dibasic acid attached to every "recurring radical" or building block of shellac, which is stated in the literature to consist approximately 70% of 9, 10, 16-trihydroxypalmitic acid, the better will be the stability of the solutions with regard to the ratio of water of dilution it will tolerate before separation takes place. When maximum water tolerance is desired, all available hydroxy groups in the shellac resin molecule are best reacted with the anhydride of the dibasic acid, as shown below:

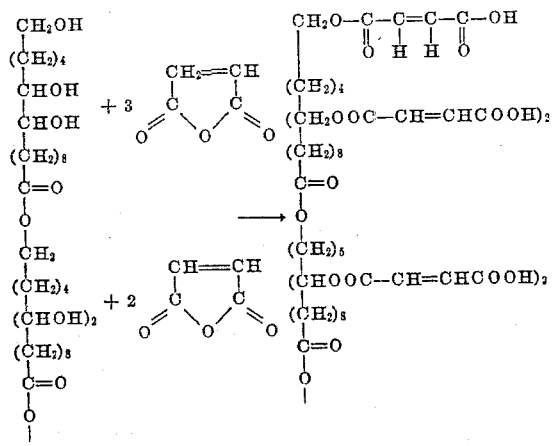

It is understood that there is a terminal unit at the other end of the chain. This unit has two hydroxyl groups like the usual recurring unit but in addition has a terminal carboxyl group, which makes up the acid number of 60 (or 50–60 which is common for shellac prior to the reaction with the anhydride of a dibasic acid).

For this purpose, it is advantageous to use the anhydrides due to their greater reactivity, especially at the more moderate elevated temperatures. The term "acid" in the claims includes the anhydrides. For every hydroxyl group esterified with phthalic anhydride or the like, at about 100° C., one carboxyl group is formed. When the corresponding dibasic organic acids are substituted, the reaction has to be carried out at somewhat higher temperatures. Then, it is not as direct as with the anhydrides, as side reactions will accompany the desired esterification of but one carboxy group of the dibasic acid while some of other molecules of the acid might not partake in the reaction.

The reactions with the anhydrides of dibasic acids are easily carried out as the alcoholysis of the acid anhydride takes place readily at but slightly elevated temperatures. Thus, if desired, all the hydroxyl groups in shellac may be esterified with as many molecules of dibasic acids, resulting in as many free carboxyl groups as hydroxyl groups are esterified. Such a modified shellac shows improved water tolerance in diethylene glycol solutions. In many instances, the modified shellac solutions improve the length and flow characteristics of buttery steam setting printing inks, if but small proportions of the reacted shellac are incorporated. The modified shellac, as described, is a somewhat acidic material. Its acidity may be reduced by reacting it with polyhydric alcohols. However, a large number of terminal carboxyl groups can be attached to shellac with a resulting better solubility in the low molecular weight polyhydric alcohols. When tribasic acids are substituted, approximately two of the carboxyl groups remain terminal for every one esterified by the shellac with a resulting improved solubility in the glycols and glycerol and enhanced water tolerance of the solutions. With tetra, penta, and hexabasic acids, a still greater number of terminal acid groups can be attached for every shellac hydroxyl group esterified.

It is a further object of this invention to provide for a printing ink, which has shellac reacted with a polybasic organic acid of three or more carboxyl groups as the binder and a low molecular weight polyhydric alcohol as the solvent. This reaction of the shellac with the polybasic acid is conveniently carried out at about 150° C. for ¼ to two hours, with the aim for a high acid number of the resulting ester product.

The solutions of shellac reacted with polybasic acids are transparent and dry with a good luster. They can be used for printing over prints to provide them with improved scuff resistance. When glossy films are desired, it is advantageous to rely on air drying or the evaporation of the solvent by exposure to heat.

The solutions have a very strong acid reaction. The acidity can be reduced by the addition of ammonia or amines. Complete neutralization is seldom desirable, especially with prints or overprinting applications, to be hardened by exposure to steam, an acid number of about 100 is required so that non-offsetting can be accomplished. The partial neutralization of the acid groups improves the water tolerance of the solutions. It has the disadvantage of decreasing the water resistance of the dry films.

I have further found that the carboxyl group of natural shellac can be neutralized with ammonia or amines. The neutralized product in diethylene glycol has more water tolerance than the natural product; it imparts flow and length to some diethylene glycol-base printing inks, especially those which contain low oil absorption pigments. The preferred method of preparing neutralized shellac solution consists in adding the proper amount of amine or ammonium salt, such as ethylene diamine, to the polyhydric alcohol and while stirring add powdered shellac to the solution in the same manner as set forth in Examples XXI–XXIV.

The reaction between shellac and polybasic acid may be conducted in the presence of a resin which is soluble in ethyl alcohol but insoluble in the low molecular weight polyhydric alcohols. After the reaction, the added resin remains dispersed in the solution of modified shellac in polyhydric alcohol. While the added resin has little tendency to partake in the modification of shellac, it may be considered as an inert flux which upon melting dissolves shellac so that the reaction can be carried out at lower temperatures. Among the many alcohol soluble resins are gum of manila, pontianak resin, sandarac resin, phenol-formaldehyde adducts, alkyds and maleic resins of high acid number, sulfamide resins, phenol modified indene-coumarone resins, and phenol modified terpenes.

Instead of an added resin, solvents which are not reactive or which have little tendency to react with the organic acid can be present during the modification of the shellac so that the reaction may take place below the fusion point of the shellac-organic acid mixture. Among the useful solvents are ketones and phenols. The ketones may be driven off after the reaction is completed; while the phenols can be reacted with aldehydes for the formation of phenol-aldehyde adducts.

Since shellac is a natural product, all shipments are usually different from each other in solubility and reactivity. On aging, shellac has the tendency to become less soluble gradually, with the result that on very long storage, it will eventually become completely insoluble. It is thus advisable to use preferably the most alcohol soluble grades of shellac, though the older shipments and purer grades might be used providing sufficient precautions are taken during the processing. The recommended practice consists of sampling the mixture of shellac and polybasic acid from time to time during the processing and noting the progress of the reaction. The undesired side reaction is the accelerated aging phenomenon at elevated temperatures; it is manifested by progressive increases in the viscosity of the alcohol solutions of the samples. By setting up a series of standards for any shellac sample from its initial viscosity to that very viscous state which is very close to the gelation point, any other sample or shipment can be controlled during the processing to avoid solidification during the reaction with the polybasic acids.

The method of practicing this invention is more specifically illustrated by the following examples, in which the parts are by weight:

*Example I*

15 parts of shellac and 15 parts of phthalic anhydride are powdered and mixed well. The mixture is heated to about 150° C. for about one hour. Then 70 parts of ethylene glycol are gradually stirred into this melt and held between 80 and 120° C. until solution is complete.

*Examples Ia, Ib and Ic*

In these examples, propylene glycol, butylene glycol or glycerol were substituted for ethylene glycol. The vehicles were pigmented with 15 parts of carbon black, 50 parts chrome yellow pigment, 50 parts titanium white, or 20 parts of toluidine red, respectively, to produce a printing ink.

*Example II*

15 parts shellac and 10 parts of phthalic anhydried are powdered and mixed well. The mixture is heated to about 150° C. and kept at this temperature for about ½ hour. Then, 75 parts propylene glycol are gradually stirred into this melt and held between 80 and 120° C. until solution is complete.

In this example, ethylene glycol, butylene glycol or glycerol can be substituted for propylene glycol and pigmentation can be carried out as in Example I.

*Example III*

30 parts of shellac and 13 parts of maleic anhydride are powdered and mixed well. The mixture is slowly heated to 130° C. and held at this temperature for ½ hour. Then, 157 parts of butylene glycol are gradually stirred into the melt and held between 80 and 130° C. until the solution is complete.

In this example, ethylene glycol, propylene glycol, or glycerol may be substituted for butylene glycol as in Example I.

*Example IV*

15 parts of shellac and 10 parts itaconic anhydride are powdered and mixed well. The mixture is slowly heated to 130° C. and held at this temperature for ½ hour. Then, 75 parts of glycerol are slowly poured into the melt and held between 80 and 130° C. until solution is complete.

In this example, ethylene glycol, propylene glycol and butylene glycol, respectively, may be substituted for glycerol.

*Example V*

15 parts of shellac and 10 parts succinic anhydride are powdered and mixed well. The mixture is slowly heated to 150° C. and held at this temperature for 15 minutes. Then 75 parts of propylene glycol are gradually stirred into the solution and held at 80 to 150° C. until the solution is complete.

*Example VI*

15 parts of shellac and 10 parts of glutaric anhydride are powdered and mixed well. The mixture is heated gradually to 110° and held at this temperature for two hours. Then, 75 parts of propylene glycol are gradually stirred into the melt and held at 70 to 110° C. until solution is complete.

*Example VII*

15 parts of shellac, 15 parts of soft phenol-modified idene-coumarone resin, and 9 parts of phthalic anhydride are slowly heated to 110° C. and held at this temperature for one hour. Then, 157 parts propylene glycol are gradually poured into the melt and held at this temperature until solution is complete.

*Example VIII*

15 parts of shellac, 10 parts of acetone, and 9 parts of phthalic anhydride are gradually heated in a kettle provided with a reflux condenser and an agitator, under reflux until a homogeneous solution is formed. Though acetone will continually reflux, the temperature of the charge in the kettle will gradually rise to 100° C. After distilling off half of the acetone, the temperature of the contents reaches about 120° C. Then, 71 parts of propylene glycol are gradually added while the temperature of the charge is kept at about 90° until solution is complete. Then the batch is gradually cooled under continued agitation.

*Example IX*

15 parts of shellac, 5 parts of phenol, and 9 parts phthalic anhydride are melted together at about 130° C. and kept at this temperature for about ½ hour. Then 76 parts propylene glycol are gradually added and the charge is held between 90 and 130° C. until solution is complete.

The strong odor of phenol can be obviated by reacting with 2 parts of paraformaldehyde or hexamethylene tetramine for 15 to 30 minutes between 90 and 120° C. Other suitable reagents which can be used for the same purpose are paraldehyde, trioxane, furfural or some other aldehyde with boiling point above 90° C.

*Example X*

15 parts of shellac, 5 parts phenol, and 9 parts fumaric acid are melted together at about 150° C. and held at this temperature for about 2 hours.

Then 76 parts of propylene glycol are gradually added and then the charge is held between 90 and 130° C. until solution is complete.

*Example XI*

15 parts of shellac, 5 parts of phenol, and 10 parts tricarballylic acid are melted together at about 150° C. and held at this temperature for about 2 hours. Then, 76 parts of propylene glycol are gradually added and the charge is held between 90 to 130° C. until solution is complete.

*Example XII*

15 parts of shellac, 5 parts of phenol, and 12 parts of camphoronic acid are melted together at about 150° C. and held at this temperature for about 2 hours. Then, 74 parts of propylene glycol are gradually added, and the charge is held between 90 and 130° C. until solution is complete.

*Example XIII*

15 parts of shellac, 5 parts of phenol, and 10 parts of aconitic acid are melted together at about 150° C. and held at this temperature for about two hours. Then, 75 parts of propylene glycol are gradually added and the charge is held between 90 and 130° C. until solution is complete.

*Example XIV*

15 parts of shellac, 5 parts of phenol, and 10 parts of trimesic acid (a benzene tricarboxylic acid) are melted together at about 150° C. and held at this temperature for about two hours. Then, 75 parts of propylene glycol are gradually added and the charge is held between 90 and 130° C. until solution is complete.

*Example XV*

15 parts of shellac, 5 parts of phenol, and 9 parts of mellophanic acid (a benzene tetracarboxylic acid) are melted together at about 150° C. and held at this temperature for about two hours. Then, 76 parts of propylene glycol are gradually added and the charge is held between 90 and 130° C. until solution is complete.

*Example XVI*

15 parts of shellac, 5 parts phenol, and 6 parts of mellitic acid (benzene hexacarboxylic acid) are melted together at about 150° C., and held at this temperature for about two hours. Then, 76 parts of propylene glycol are gradually added and the charge is held between 90 and 130° C. until solution is complete.

*Example XVII*

15 parts of shellac, 5 parts of phenol, and 2 parts of mellitic acid are melted together at about 150° C., and held at this temperature for about 1 hour. Then, 78 parts of 1,3-butylene glycol are gradually added, and the charge is held between 90 and 130° C. until solution is complete.

*Example XVIII*

15 parts of shellac, 5 parts of phenol, and 2 parts of mellitic acid are melted together at about 150° C., and held at this temperature for about 1 hour. Then, 76 parts of ethylene glycol are gradually added while the temperature of the charge is held at about 120° C. 2 parts of guanidine carbonate are cautiously added in small portions. Stirring of the charge held at about 120° is continued and 3 parts of paraformaldehyde are added. After ½ hour, the batch is cooled and filtered.

Paraformaldehyde can be replaced by paraldehyde, furfural, benzaldehyde or some other liquid aldehyde with a boiling point at 80° C. or above. When the reaction is carried out with one of the aldehydes whose boiling point is below the cooking temperature, it is necessary to add the aldehyde slowly through the condenser at such a rate that all vapors can be condensed.

*Example XIX*

15 parts of shellac and 15 parts of phthalic anhydride are powdered and mixed well. The mixture is heated to about 150° C. for about one hour. Then 70 parts of diproplyene glycol are gradually stirred into this melt and held between 80 and 120° C. until solution is complete.

*Example XX*

15 parts shellac and 10 parts of phthalic anhydride are powdered and mixed well. The mixture is heated to about 150° C. and kept at this temperature for about ½ hour. Then, 75 parts dipropylene glycol are gradually stirred into this melt and held between 80 and 120° C. until solution is complete.

*Example XXI*

15 parts shellac
15 parts phthalic anhydride are powdered and thoroughly mixed together in a grinding mill and then heated in a vessel by indirect heat to about 150° C. and kept at this temperature for 1 hour. At this temperature 70 parts of diethylene glycol are added. The mixture is stirred at about 150° C. until solution is complete.

*Example XXII*

15 parts shellac
12 parts maleic anhydride are powdered and mixed well. The mixture is heated to about 150° C. and held at this temperature for 1 hour. At this temperature 73 parts diethylene glycol are added and heating is continued to effect solution.

*Example XXIII*

15 parts Nevillac hard (a phenolic modified indene-coumarone resin)
15 parts shellac
30 parts phthalic anhydride are powdered and mixed well, and heated to 150° C. and kept at this temperature for 15 minutes. Then 40 parts diethylene glycol are added slowly and the temperature is kept at 150° C. to effect solution.

*Example XXIV*

15 parts Nevillac hard
15 parts shellac
15 parts phthalic anhydride are powdered and mixed well, heated to 150° C. and kept at this temperature for 15 minutes. Then 55 parts diethylene glycol are added, and the temperature is raised to 200° C. and kept at this temperature for two hours.

*Example XXV*

15 parts of shellac, 5 parts of phthalic anhydride, and 2 parts of soft phenol-modified indene-coumarone resin are heated together and held at 110° C. for 2 hours. Then, 78 parts of ethylene glycol are gradually added while the charge is held at 70 to 110° C. Stirring is continued until solution is complete. After cooling to 60° C., ½ part of morpholine is added and mixed into the solution.

Instead of morpholine, a corresponding amount of any other amine, primary, secondary or tertiary, can be used. The amount can vary; a small portion of the carboxy groups thus neutralized improves the water tolerance of the system so that no premature hardening of the printing inks, for which these solutions are used as vehicles for the coloring substance, should occur on the printing presses regardless of high humidity. For very reactive pigments, such as chrome yellow or toners of heavy metal poly acids, this neutralization of the acid groups of shellac reacted with polybasic acids might be carried to completion. For such purposes, it is advantageous to utilize volatile amines, such as ethylene diamine, diethylenetriamine, diethylamine, triethylamine, propylamine, morpholine, pyridine, monoethanolamine or the like. When partial neutralization is desired, less volatile amino compounds can also be used to advantage.

The partial or complete neutralization is not necessarily confined to Example XXV, which was merely used for a demonstration. Any one of the other examples can be successfully submitted to the neutralization procedure, with the object and result of improving the water tolerance of the respective system in relation to the water-sensitivity of the polyhydric alcohol used.

The amount of polyhydric alcohol in the examples is not critical. Usually about 70 parts are mentioned. However, satisfactory vehicles can be made with but 20 parts. If thick pastes are wanted, still less, such as 10 parts, are sufficient when 15 parts of shellac are thus reacted. The resulting compositions can always be thinned later by addition of more polyhydric alcohol so that the total amount would be between 10 and 150 parts. For making printing inks, the vehicles with 50 to 80 parts are preferred, and they can be mixed with organic and inorganic pigments and also with dyes. The amount of coloring material may vary depending upon the covering strength desired. If a gray print is desired, as little as one percent of carbon or lamp black would be sufficient. Should a dark black effect be required, from 12 to 18% of a strong carbon black would be required. A well covering yellow ink might contain 10% of benzidine yellow or 30 to 50% of chrome yellow. About 30% of lithol red, bronze blue, toluidine red or methyl violet toners can be used in these various colored inks. Tints would require considerably less, and depending upon the effect desired, as little as 5%, perhaps less, is needed. Similar results can be obtained with soluble dyes in the amounts from ½ to 25%. The advantages would consist in greater brilliancy and transparency of the impressions.

The preceding examples have set forth the preparation of the polybasic acid-reacted shellac solutions in polyhydric alcohols and their application in printing inks. They are illustrative and should not be conceived as the limits of the invention.

It will be apparent that various modifications may be made by those skilled in the art without departing from the scope and spirit of the invention as set forth in the appended claims.

I claim:

1. A printing ink with high humidity tolerance capable of being set by steam, comprising coloring matter dispersed in a vehicle comprising from 40% to 70% by weight diethylene glycol and a binder, said binder being a reaction product produced by heating at about 150° C. substantially one part of shellac and from one to two parts of an acid selected from the group consisting of phthalic and maleic.

2. A printing ink with high humidity tolerance capable of being set by steam, comprising coloring matter dispersed in a vehicle comprising a major portion by weight of diethylene glycol and a minor portion of a binder, said binder being a reaction product produced by heating at about 150° C. substantially one to two parts by weight of phthalic acid and one part of shellac.

3. A printing ink with high humidity tolerance capable of being set by steam, comprising coloring matter dispersed in a vehicle comprising a major portion by weight of diethylene glycol and a minor portion of a binder, said binder being the reaction product produced by heating at about 150° C. substantially one to two parts by weight of maleic acid and one part of shellac.

4. A printing ink with high humidity tolerance capable of being set by steam, comprising coloring matter dispersed in a vehicle comprising a major portion by weight of a polyhydric alcohol having from 2 to 3 hydroxy groups and from 2 to 6 carbon atoms, and a binder dissolved in said vehicle, said binder being a reaction product produced by heating substantial portions of shellac and a solid polybasic carboxylic acid having more than 3 carbon atoms and containing only C, H, and O at from about 100° C. to 150° C.

5. A printing ink with high humidity tolerance capable of being set by steam, comprising coloring matter dispersed in a vehicle comprising a major portion by weight of a glycol having 2-6 carbon atoms and a binder dissolved in said vehicle, said binder being a reaction product produced by heating substantial portions of shellac and a solid polybasic carboxylic acid having more than 3 carbon atoms and containing only C, H, and O at from about 100° C. to 150° C.

6. A printing ink with high humidity tolerance capable of being set by steam, comprising coloring matter dispersed in a vehicle comprising a major portion by weight of glycerol and a binder dissolved in said vehicle, said binder being a reaction product produced by heating substantial portions of shellac and a solid polybasic carboxylic acid having more than 3 carbon atoms and containing only C, H, and O at from about 100° C. to 150° C.

7. A printing ink with high humidity tolerance capable of being set by steam, comprising coloring matter dispersed in a vehicle comprising a major portion by weight of propylene glycol and a binder dissolved in said vehicle, said binder being a reaction product produced by heating substantial portions of shellac and a solid polybasic carboxylic acid having more than 3 carbon atoms and containing only C, H, and O at from about 100° C. to 150° C.

8. A printing ink with high humidity tolerance capable of being set by steam, comprising coloring matter dispersed in a vehicle comprising a major portion by weight of a polyhydric alcohol having from 2 to 3 hydroxy groups and from 2 to 6 carbon atoms, and a binder dissolved in said vehicle, said binder being a reaction product produced by heating substantial portions of shellac and a solid polybasic carboxylic acid having more than 3 carbon atoms and containing only C, H, and O and having 2-6 carboxyl groups at from about 100° to 150° C.

9. A printing ink with high humidity tolerance capable of being set by steam, comprising coloring matter dispersed in a vehicle comprising a major portion by weight of a polyhydric alcohol having from 2 to 3 hydroxy groups and from 2-6 carbon atoms, and a binder dissolved in said vehicle, said binder being a reaction product produced by heating substantial portions of shellac and a solid dibasic carboxylic acid having more than 3 carbon atoms and containing only C, H, and O at from about 100° C. to 150° C.

10. A printing ink with high humidity tolerance capable of being set by steam, comprising coloring matter dispersed in a vehicle comprising a major portion by weight of a polyhydric alcohol having from 2 to 3 hydroxy groups and from 2 to 6 carbon atoms, and a binder dissolved in said vehicle, said binder being a reaction product produced by heating substantial portions of a solid tribasic carboxylic acid having more than 3 carbon atoms and containing only C, H, and O at from about 100° C. to 150° C.

ALFRED F. SCHMUTZLER.

REFERENCES CITED

The following references are of record in the file of this patent:

UNITED STATES PATENTS

| Number | Name | Date |
|---|---|---|
| 1,091,627 | Callahan | Mar. 31, 1914 |
| 1,663,183 | Schmidt | Mar. 20, 1928 |
| 2,318,096 | Quick | May 4, 1943 |
| 2,323,710 | Erickson et al. | July 6, 1943 |
| 2,338,892 | Bassford | Jan. 11, 1944 |
| 2,346,963 | Jeuck | Apr. 18, 1944 |
| 2,387,388 | Gardner | Oct. 23, 1945 |

FOREIGN PATENTS

| Number | Country | Date |
|---|---|---|
| 376,413 | Great Britain | July 14, 1932 |
| 439,524 | Great Britain | Dec. 9, 1935 |
| 468,542 | Great Britain | July 7, 1937 |
| 712,065 | Germany | Oct. 11, 1941 |